Dec. 8, 1953 J. H. DULLIGAN 2,661,541
HELICALLY-COILED HOLE GAUGE
Filed July 28, 1951
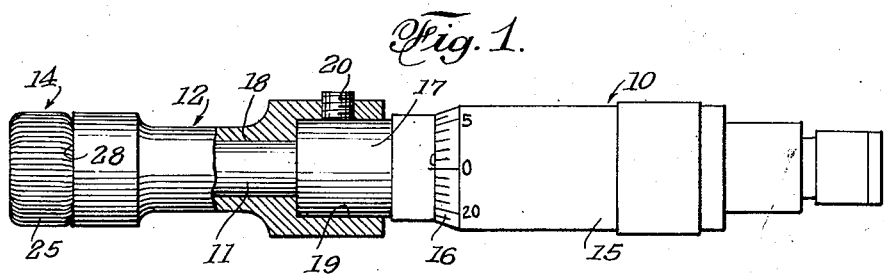
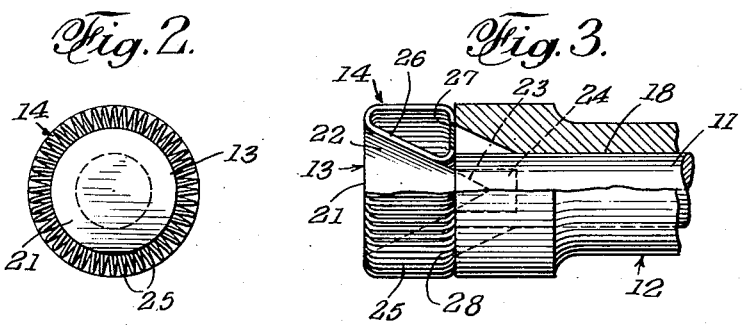
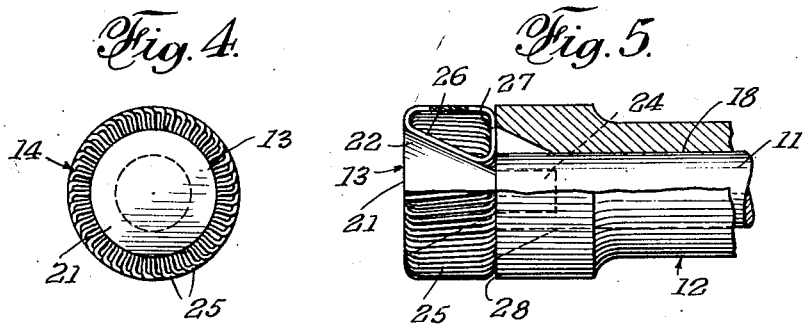
Inventor
JOHN H. DULLIGAN
By C. G. Stratton
Attorney Patented Dec. 8, 1953

2,661,541

UNITED STATES PATENT OFFICE 2,661,541

HELICALLY-COILED HOLE GAUGE

John H. Dulligan, South Gate, Calif.

Application July 28, 1951, Serial No. 239,152

5 Claims. (Cl. 33—178)

This invention relates to measuring devices and deals more particularly with a device for measuring internal diameters.

This application is a continuation-in-part of my pending application, Serial No. 195,219, filed November 13, 1950.

The inspection of small holes such as drilled and small reamed holes, at the present time, entails the use of a multiplicity of expensive gauges of the "go—no go" type, even when the range of hole sizes is relatively small. These latter sizes range between .234" and .413" and, while not intended as limiting, indicate the general range contemplated for the present gauge.

Accordingly, it is an object of the present invention to provide a hole gauge more particularly adapted to measure relatively small holes, as above indicated, in a manner to expedite inspection and reducing expense.

Whereas prior devices depended on oppositely directed pins to gauge an internal diameter, the same, unless considerable time was used to effect at least two gauging operations for each hole, would give inaccurate readings if the hole were not truly round. Also, if such prior tools were not squarely entered into a hole, the angle of presentation to the hole would affect the reading. A further object of the invention, therefore, is to provide a hole gauge that automatically centers and squares itself in the hole being gauged and, at all times, will give the same reading regardless of the "out-of-round" condition of the hole.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration and example only.

In the drawings, like reference characters designate similar parts in the several views.

Fig. 1 is an elevational view, partly in longitudinal section, of a hole gauge embodying a conventional micrometer head.

Fig. 2 is an enlarged end elevational view thereof.

Fig. 3 is a similarly enlarged elevational view, in quarter section, of the gauging end of said gauge.

Figs. 4 and 5 are views respectively similar to Figs. 2 and 3 of an alternate form of the invention.

The gauge that is illustrated comprises, generally, a micrometer head 10 having a stem 11, a body 12 fixedly connected to said head, cone members 13 carried by the stem, and a helically coiled annular gauge element 14 encircling the cone means 13.

The micrometer head is generally conventional and comprises a barrel 15 from the graduated end 16 of which fixedly extends stem 11. While not shown, the stem, in that portion which is within barrel 15, is threaded and has threaded connection with sleeve 17, which is concentric with the stem. It will be clear that relative rotation of the barrel and sleeve will result in relative axial movement of said barrel and sleeve. For the purposes of this disclosure, it is assumed that sleeve 17 is fixed and that barrel 15 and stem 11 revolve and more axially with respect thereto.

In the present case, the body 12 is shown as a tubular member having a bore 18 for stem 11 and a counterbore 19 that receives sleeve 17. A set screw 20 is used to effect separable connection of the body on said sleeve.

The cone means 13 comprises a tip 21 that has a conical face 22 and is separably affixed to the end of stem 11 as by means of a shank 24 fitted into a bore provided in said stem end. The slope of face 22 is from the outer end inward so that the outer is the larger end and the top constitutes a spreading wedge when the stem is retracted relative to body 12. The angle of face 22 is the angle of the hypotenuse of a right triangle in which one leg is the radius of the larger end of tip 21 and the other leg is the length along the axis of the tip from said larger end to a point where the axis intersects a continuation 23 of the slope of face 22. Said radius leg is half the length of the other leg. Consequently, the slope of the hypotenuse or face 22 is two-to-one.

The gauge element 14 is a helically coiled member that comprises an annulus which encircles tip 21. Said member is formed to have outer gauging coils portions 25 that are cylindrically arranged, inner sloping tip-engaging coil portions 26 at the angle of the slope of said tip, and interconnecting coil portions 27. The coil portions 25, 26 and 27 are arranged as a right triangle having exactly the same characteristics as has the hereinbefore mentioned right triangle.

The coil portions 27 engage a flat squared end 28 of body 12.

The element 14 is integrally formed of spring wire of round or square cross-section and it will be clear that endwise retraction of tip 21 will cause face 22 to wedge against coil portions 26 and, thereby, expand element 14 to increase the gauging diameter assumed by coil portions 25. Because of the two-to-one slope of tip face 22, the diametral expansion of coil portions 25 equals the axial movement of stem 11.

The form of Fig. 3 shows coil portions 25 parallel to the axis of stem 11. Accordingly, coil portions 27 are not truly radial but tangent to a small circle generated around the center of said axis. In the form of Fig. 5, said coil portions 25 are shown as helically arranged and the coil portions 27, accordingly, are truly radial. It will be realized that the two forms shown may be each modified to have coil portions 25 helically arranged between that of Fig. 5 and parallel arrangement of Fig. 3.

While the invention that has been illustrated and described is now regarded as the preferred embodiments, the construction is, of course, subject to modifications without departing from the spirit and scope of the invention. It is, therefore, not desired to restrict the invention to the particular forms of construction illustrated and described, but to cover all modifications that may fall within the scope of the appended claims.

Having thus described the invention, what is claimed and desired to be secured by Letters Patent is:

1. A hole gauge comprising a micrometer head having a fixed sleeve and an axially movable stem extending concentrically from said sleeve, an elongated body removably affixed to the sleeve and having a bore through which the stem extends, a conical member on the end of said stem, said member having its smaller end adjacent the stem, and an annular helically coiled and elastic means encircling the conical member and having abutment against the end of the elongated body, the outer coil portions of the elastic means being straight describing a cylindrical gauging annulus and the inner coil portions being conically disposed to engage the conical member.

2. A hole gauge according to claim 1: said conical member having a sloping face that is the hypotenuse of a right triangle of which one leg is the radius of the larger end of said member and the other leg is the perpendicular length along the axis of said member from said larger end to where the axis intersects a continuation of said sloping face, the second leg being twice the length of the first leg.

3. A hole gauge comprising a micrometer head having a fixed sleeve and an axially movable stem extending concentrically from said sleeve, an elongated body removably affixed to the sleeve and having a bore through which the stem extends, a conical member on the end of said stem, said member having its smaller end adjacent the stem, and an annular helically coiled and elastic means encircling the conical member and having abutment against the end of the elongated body, the outer coil portions of the elastic means being straight describing a cylindrical gauging annulus and the inner coil portions being conically disposed to engage the conical member, said annular member comprising an integral length of spring wire formed to have the mentioned coil portions.

4. A hole gauge according to claim 1: the outer coil portions being parallel to the axis of the conical member and of the mentioned stem.

5. A hole gauge according to claim 1: the outer coil portions being helicallly disposed.

JOHN H. DULLIGAN.

References Cited in the file of this patent

UNITED STATES PATENTS

| Number | Name | Date |
|---|---|---|
| 2,047,607 | Zimmerman | July 14, 1936 |
| 2,135,912 | Rae | Nov. 8, 1939 |
| 2,535,897 | Buisson | Dec. 26, 1950 |

FOREIGN PATENTS

| Number | Country | Date |
|---|---|---|
| 582,941 | Great Britain | Dec. 3, 1946 |